W. H. LYMAN.
Improvement in Horseshoe-Nail Clinchers.
No. 128,642.　　　　　　　　　　　　　　　Patented July 2, 1872.
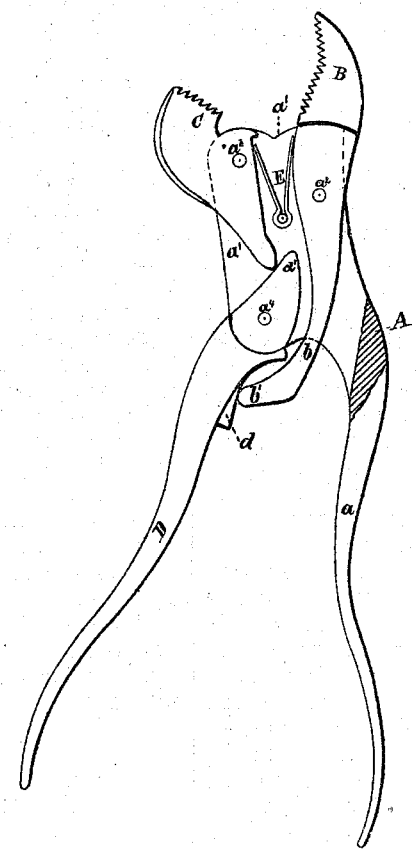

128,642

UNITED STATES PATENT OFFICE.

WILLIAM H. LYMAN, OF SPRINGFIELD, MISSOURI.

IMPROVEMENT IN HORSESHOE-NAIL CLINCHERS.

Specification forming part of Letters Patent No. 128,642, dated July 2, 1872.

Specification describing a new and Improved Horseshoe-Nail Clincher, invented by WILLIAM H. LYMAN, of Springfield, in the county of Greene and State of Missouri.

The invention will first be fully described and then clearly pointed out in the claim.

The drawing is a side view with a portion removed to show more clearly the working parts.

A is the frame, to which the other parts are attached, consisting of handle $a$, and upright sides or bifurcation $a^1 a^1$. B is the lower jaw, pivoted at $a^2$, and having long shank $b$, with upwardly-projecting end $b'$. C is the upper jaw, pivoted at $a^3$. D is the actuating-lever, pivoted at $a^4$, having incline $d$ in rear of its fulcrum, and point $d'$ in front thereof. E is a spring, located between the jaws B C, and also extending back between their fulcrums for the purpose of retracting them. The working faces of the jaws are serrated, as shown.

The mode of operation is as follows:

The nail being driven into the hoof so as to hold the shoe in the ordinary way, the jaw B is placed under its head, while the jaw C is brought down upon the end of nail projecting from the hoof. The handles now being forced together, the actuating-lever D raises the power end of lever-jaw C while it depresses that of jaw B, thereby holding the nail firmly to its seat with the bottom jaw, while the end is being clinched upon the hoof in a firm and workmanlike manner by the upper jaw. The lower jaw B and lever D, turning on circles eccentric to each other, the incline $d$ is graduated in proportion to the increasing divergence in the orbits.

The advantages of my device are, first, that I take off all side strain from the screws, thereby retaining all the parts in their true relative position, and thus forming a more durable tool; secondly, that I secure a double leverage on jaws, whereby a single gripe of one hand clinches the nails accurately and perfectly; and, thirdly, that the curve on lower jaw prevents said jaw from being thrown off nail, enables it to rock on nail-head, and to hold the nail firmly down level with the shoe of a flaring hoof.

I am aware that some of these advantages are shown in particular tools, but I believe that no one before myself has ever combined them all in one tool; therefore,

What I claim as new, and desire to secure by Letters Patent, is—

A horseshoe-nail clincher composed of handle $a$ having sides $a^1 a^1$, the lever-handle D $d'$, the jaw B having shank $b\ b'$, and the short jaw C, all constructed, arranged, and combined, substantially as and for the purpose set forth.

WILLIAM H. LYMAN.

Witnesses:
 J. D. JENKINS,
 CHRIS. C. DAWSON.